Figure 1:
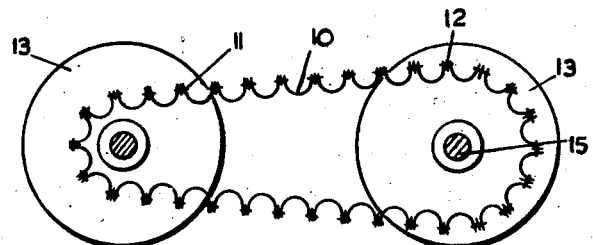

April 1, 1952  R. MARTIN  2,590,988

POWER-TRANSMISSION BELT

Filed Oct. 1, 1949

R. MARTIN
INVENTOR

ATTORNEYS

Patented Apr. 1, 1952

2,590,988

UNITED STATES PATENT OFFICE 2,590,988

POWER-TRANSMISSION BELT

Robert Martin, Spondon, near Derby, England, assignor to British Celanese Limited, a corporation of Great Britain Application October 1, 1949, Serial No. 119,039
In Great Britain October 5, 1948

4 Claims. (Cl. 74—236)

This invention relates to power transmission belts and particularly to V belts of the type suitable for use in variable speed friction drives in association with smooth-faced expanding V pulleys.

A common form of belt of this type comprises an endless band of leather, balata or multi-ply fabric, which has secured to its inner face by nuts and bolts a series of aluminium or wooden bars or lags, the heads of which project at each side of the band. Secured to the outer faces of the heads by means of rivets are leather pads which make contact with the inner faces of the pulley discs. The inner faces of the pulley discs are in the form of a flat cone, having a semi-vertical angle of the order of 80–85°, and the faces of the heads of the bars are inclined to conform to the faces of the pulleys. Belts of this form are liable to the disadvantage of frequent breakages, particularly of the transverse bars, and of rapid wear of the pads, giving rise to unduly high maintenance costs and stoppages in operation. It has been found that the high rate of breakage has been due to the stiffness of the belt which also makes it difficult for the belt to turn round a curve of small radius as is required when one of the pairs of pulley discs are widely separated (and the other pair close together) to give an extreme speed ratio. It is an object of the present invention to provide a V belt in which these disadvantages are overcome or substantially reduced.

According to the present invention a V belt comprises a series of short flexible belt sections having their adjacent pairs of ends turned or bent in the same direction and pierced to receive links connecting a pair of bars between which the ends of each pair are loosely nipped, the width of each section towards the ends thereof being different from that in the middle so that the edges of the sections conform to the angle of the V pulleys with which the belt is to be used and constitute driving surfaces for engagement with the pulleys. Preferably, the ends of each section are turned outwards, and are wider than the middle of the section. Advantageously a further strip of flexible material can be inserted at each joint between the out-turned ends of the belt sections, this strip pointing radially inwards when engaged with the pulleys and being tapered, like the sections themselves, to conform to the angle of the pulley faces. This has the advantage of increasing the driving area between belt and pulley and of reducing the rate of wear.

The belt of the present invention is applicable to belt and V pulley drives generally, but is particularly applicable to variable speed drives of the type in which axially expanding pulleys are used. The extreme flexibility of the belt allows it to be used on pulleys of small diameter, e. g. with the fully expanded pulleys of variable speed drives of the type referred to above. In comparison with the type of belt previously used, breakages are much less frequent and wear is less.

As the flexible material from which the sections of the belt are formed, both leather and balata are highly suitable since, besides having the necessary flexibility they also present edges suitable for engagement with the faces of the pulleys without being subject to unduly rapid wear.

Figure 3:
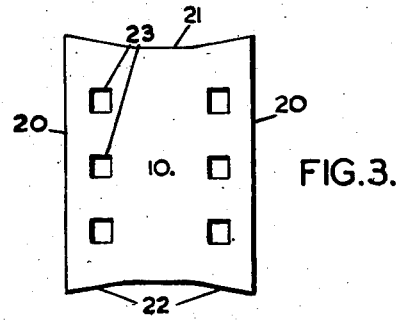
Figure 4:
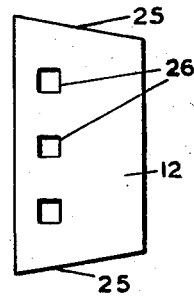
Figure 7:
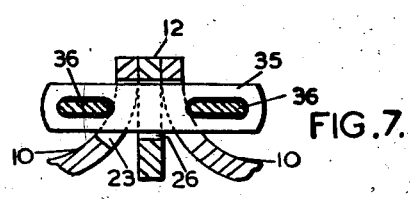
Figure 8:
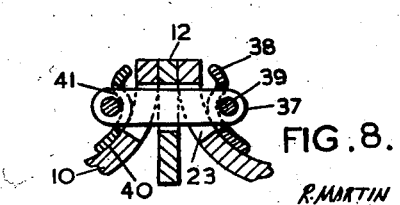

For joining the sections of the belt to one another there are several common types of belt fastener, whose usual function is to join together the two ends of a belt consisting of a single piece of belting, the fastenings being of the type which form a flanged joint between the ends joined and not either a butt joint or a lap joint. The preferred form of fastener is one comprising an element of comb form the teeth of which, relatively widely spaced, are adapted to pass through holes in the parts of the belt to be joined and are turned up at the ends to form hooks adapted to engage with the back of a second comb on the opposite side of the joint, the teeth of the second comb being shorter than those of the first and entering the holes in the belt parts in the opposite direction. Another and simpler form of fastening consists of a series of separate straight links which are passed through the holes in the belt sections and are formed with a hole at each end through which are slipped two flat bars, serving to keep the belt ends loosely nipped together. A third form of fastening is an elaboration of the second wherein two round bars are used and between these bars and the surface of the belt are interposed sheet metal strips, perforated for the passage of the links, and of curved cross section so as to form a shoulder for locking the round bars and to present a curved surface to the ends of the sections. By way of example one form of belt in accordance with the present invention will now be described in greater detail with reference to the accompanying drawing in which, Figure 1 is a diagrammatic sectional side elevation and, Figure 2 a plan view of the belt assembled on a pair of expanding V pulleys, Figure 3 shows a view of a separate belt section, Figure 4 shows a strip for interposition between the ends of two sections, Figures 5 and 6 are an outside face view and a sectional side elevation of one form of fastening between sections and, Figures 7 and 8 are views similar to Figure 6 of two alternative forms of fastening.

Figure 2:
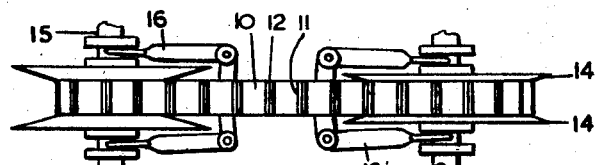

Referring to Figures 1 and 2, the belt shown therein comprises a series of sections 10 joined together with their ends turned outwards to form flanged joints 11, a strip of material 12 being interposed at each joint between the adjacent sections. The belt works between a pair of expanding pulleys 13 each consisting, as shown in Figure 2, of a pair of flat conical discs 14 of a semi-vertical angle of 85°, mounted on shafts 15 and spaced apart by a distance which is capable of being varied by means of a suitable mechanism diagrammatically indicated at 16. As one pulley is expanded, the distance between its discs 14 being increased, the other is contracted to an equal extent so that the length of belt required between the pulleys remains unaltered. In this way the speed ratio between the shafts 15 can readily be varied at will.

Each section 10 is of 4" maximum width and 3" length, and consists of leather or balata of a thickness of ¼". The form to which each section is cut is shown in Figure 3 from which it will be seen that the section 10 is tapered from the ends 20 towards the middle 21 so that the edges at 22 conform to the faces of the pulley discs 14, since the ends 20 engage the pulleys at a greater radius than the middle parts 21. Near the ends 20, each section is perforated at 23 for the passage of the fastener elements. The strip of material 12 as shown in Figure 4 has its edges 25 tapered like the portions 22 of the belt section 10 and is formed with holes 26.

Figure 5:
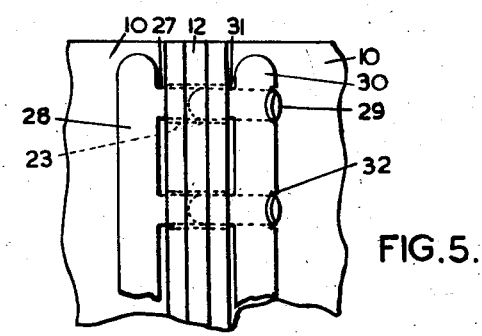
Figure 6:
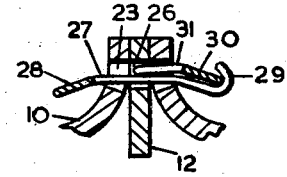

The elements 10, 12 are assembled in the manner shown in Figures 5 and 6. The ends of two sections 10 are brought together face to face with a strip 12 interposed between them, and through the holes 23, 26 are passed the teeth 27 of a comb-like member 28 made of 12 gauge sheet metal, the ends of the teeth 27 being turned up at 29. A second comb-like member 30 of 14 gauge sheet metal, having shorter teeth 31, is slipped through the holes in the opposite direction and locks into the hooked ends 29. The back of the member 30 is notched at 32 to register with the hooked ends 29. As shown in Figure 6 the members 28, 30 are of slightly bent form.

Figure 7 shows a simpler form of connection between the section 10. In this form separate flat links 35 are slipped through the holes 23, 26 and flat bars 36 are passed through perforations at each end of each of the links 35.

In the further form of fastening shown in Figure 8 flat links 37 pass not only through the holes 23, 26 but also through straight bars 38 of curved cross-section, made of 12 gauge sheet material, and round pins 39 are slipped through holes in the ends of links 37. The bars 38 present a curved surface 40 to the material of the belt section 10 and offer a locking shoulder 41 for the pins 39.

In use, the belt described above has a very long life without breakage or undue wear and if breakage does occur the replacement of a section at any point is a very simple and rapid operation. The drive is principally conveyed through the surfaces at the edges 22, 25 of the belt sections 10 and strips 12, and since the belt sections 10 are short, these occur at frequent intervals along the length of the belt so that a large wearing surface is available.

Having described by invention, what I desire to secure by Letters Patent is:

1. A V belt comprising a series of short flexible belt sections having their adjacent pairs of ends bent in the same direction and, in association with each such pair, two bars extending across the width of the belt one on each side of said pair and a plurality of links each extending through registering holes in said pair and connecting said bars so that said bars loosely nip together the end of said pair, the width of each section towards the ends thereof being different from that of the middle so that the edges of said sections conform to the angle of a V pulley and constitute driving surfaces for engagement with said pulley.

2. A V belt according to claim 1 wherein the ends of each section are turned outwards and are wider than the middle of the section.

3. A V belt according to claim 1 comprising a further piece of flexible material inserted between each pair of ends, said piece having holes registering with the holes in said pair and being shaped to conform to the edges of the sections.

4. A V belt according to claim 2 comprising a further piece of flexible material inserted between each pair of ends, said piece having lateral edges which converge so as to conform to the edges of the sections and having holes registering with the holes of said pair.

ROBERT MARTIN.

REFERENCES CITED

The following references are of record in the file of this patent:

FOREIGN PATENTS

| Number | Country | Date |
|---|---|---|
| 353,540 | Italy | Oct. 20, 1937 |
| 834,049 | France | Aug. 1, 1938 |